(12) United States Patent
Yatsu et al.

(10) Patent No.: US 11,467,703 B2
(45) Date of Patent: Oct. 11, 2022

(54) PROJECTIVE CAPACITIVE TOUCH PANEL WITH SUPPRESSED CAPACITANCE COUPLING IN CORNERS

(71) Applicant: FUJITSU COMPONENT LIMITED, Tokyo (JP)

(72) Inventors: Nobuo Yatsu, Tokyo (JP); Masahiro Kaneko, Tokyo (JP); Yayoi Tokuhara, Tokyo (JP); Kohei Takahashi, Tokyo (JP); Ying Li, Tokyo (JP); Katsuaki Koshimura, Tokyo (JP); Miki Kitahara, Tokyo (JP)

(73) Assignee: FUJITSU COMPONENT LIMITED, Tokyo (JP)

( * ) Notice: Subject to any disclaimer, the term of this patent is extended or adjusted under 35 U.S.C. 154(b) by 0 days.

(21) Appl. No.: 16/559,856

(22) Filed: Sep. 4, 2019

(65) Prior Publication Data
US 2020/0081582 A1    Mar. 12, 2020

(30) Foreign Application Priority Data

Sep. 10, 2018    (JP) .............................. JP2018-168847

(51) Int. Cl.
*G06F 3/044*    (2006.01)
*G06F 3/041*    (2006.01)

(52) U.S. Cl.
CPC .......... *G06F 3/0448* (2019.05); *G06F 3/0445* (2019.05); *G06F 3/04164* (2019.05)

(58) Field of Classification Search
None
See application file for complete search history.

(56) References Cited

U.S. PATENT DOCUMENTS

| | | | |
|---|---|---|---|
| 2008/0252608 A1* | 10/2008 | Geaghan | G06F 3/044 345/173 |
| 2013/0141369 A1* | 6/2013 | Huang | G06F 3/041 345/173 |
| 2017/0153726 A1* | 6/2017 | Lee | G06F 3/0448 |
| 2017/0269780 A1* | 9/2017 | Zhang | G06F 3/0418 |
| 2018/0240850 A1 | 8/2018 | Chen et al. | |
| 2018/0348906 A1* | 12/2018 | Hwang | G06F 3/0446 |
| 2019/0204974 A1 | 7/2019 | Gong | |

FOREIGN PATENT DOCUMENTS

| | | |
|---|---|---|
| CN | 107390963 | 11/2017 |
| CN | 108182015 | 6/2018 |
| JP | 2011-232928 | 11/2011 |

* cited by examiner

*Primary Examiner* — Amr A Awad
*Assistant Examiner* — Donna V Bocar
(74) *Attorney, Agent, or Firm* — IPUSA, PLLC

(57) ABSTRACT

A touch panel includes first arrays of electrodes, second arrays of electrodes, and an output part where leads extending from triangular end electrodes of the first arrays and the second arrays are connected to an external device. At least one corner electrode of the end electrodes which is located in a corner on one of four sides of the detection part where the output part is located has an area that is less than an area of other end electrodes.

6 Claims, 9 Drawing Sheets

PROJECTIVE CAPACITIVE TOUCH PANEL WITH SUPPRESSED CAPACITANCE COUPLING IN CORNERS

CROSS-REFERENCE TO RELATED APPLICATION

The present application is based on and claims priority to Japanese Patent Application No. 2018-168847, filed on Sep. 10, 2018, the entire contents of which are incorporated herein by reference.

BACKGROUND OF THE INVENTION

1. Field of the Invention

An aspect of this disclosure relates to a touch panel.

2. Description of the Related Art

A touch panel placed on a surface of a display is used as a human-machine interface in, for example, a personal computer or a mobile information terminal. There are roughly two types of touch panels: resistive touch panels and projective capacitive touch panels.

In a projective capacitive touch panel, a voltage is applied to one of electrodes extending in X and Y directions, and the change over time in the voltage induced on another one of the electrodes is measured. Positional information is obtained by scanning the electrodes and measuring the change for each combination of the electrodes (see, for example, Japanese Laid-Open Patent Publication No. 2011-232928).

In a projective capacitive touch panel, rhombus-shaped electrodes are typically used. In a touch panel, spaces with no electrode are formed at the four edges of the detection part. It is desirable to prevent formation of such spaces and increase the detection accuracy even at the edges of the detection part.

SUMMARY OF THE INVENTION

In an aspect of this disclosure, there is provided a touch panel including first arrays of electrodes, second arrays of electrodes, and an output part. Each of the first arrays includes multiple electrodes that include triangular end electrodes disposed at ends of each of the first arrays and rhombus-shaped electrodes that are disposed between the end electrodes. The electrodes of each of the first arrays are arranged in a first direction, and vertices of the electrodes of each of the first arrays are connected to each other. Each of the second arrays includes multiple electrodes that include triangular end electrodes disposed at ends of each of the second arrays and rhombus-shaped electrodes that are disposed between the end electrodes. The electrodes of each of the second arrays are arranged in a second direction that is substantially orthogonal to the first direction, and vertices of the electrodes of each of the second arrays are connected to each other. At the output part, leads extending from the end electrodes are connected to an external device. At least one corner electrode of the end electrodes, which is located in a corner on one of four sides of the detection part where the output part is located, has an area that is less than an area of other end electrodes of the end electrodes.

DESCRIPTION OF EMBODIMENTS

Embodiments of the present invention are described below with reference to the accompanying drawings. To facilitate the understanding of the descriptions, the same reference number is assigned to the same component throughout the drawings, and repeated descriptions of the component are omitted.

In each drawing, an X direction, a Y direction, and a Z direction are orthogonal to each other. The X direction corresponds to the direction in which electrode arrays 21-28 are arranged. The Y direction corresponds to the direction in which electrode arrays 31-36 are arranged. The Z direction corresponds to the direction in which the lower layer 2 and the upper layer 3 are stacked.

First Embodiment

Figure 1:
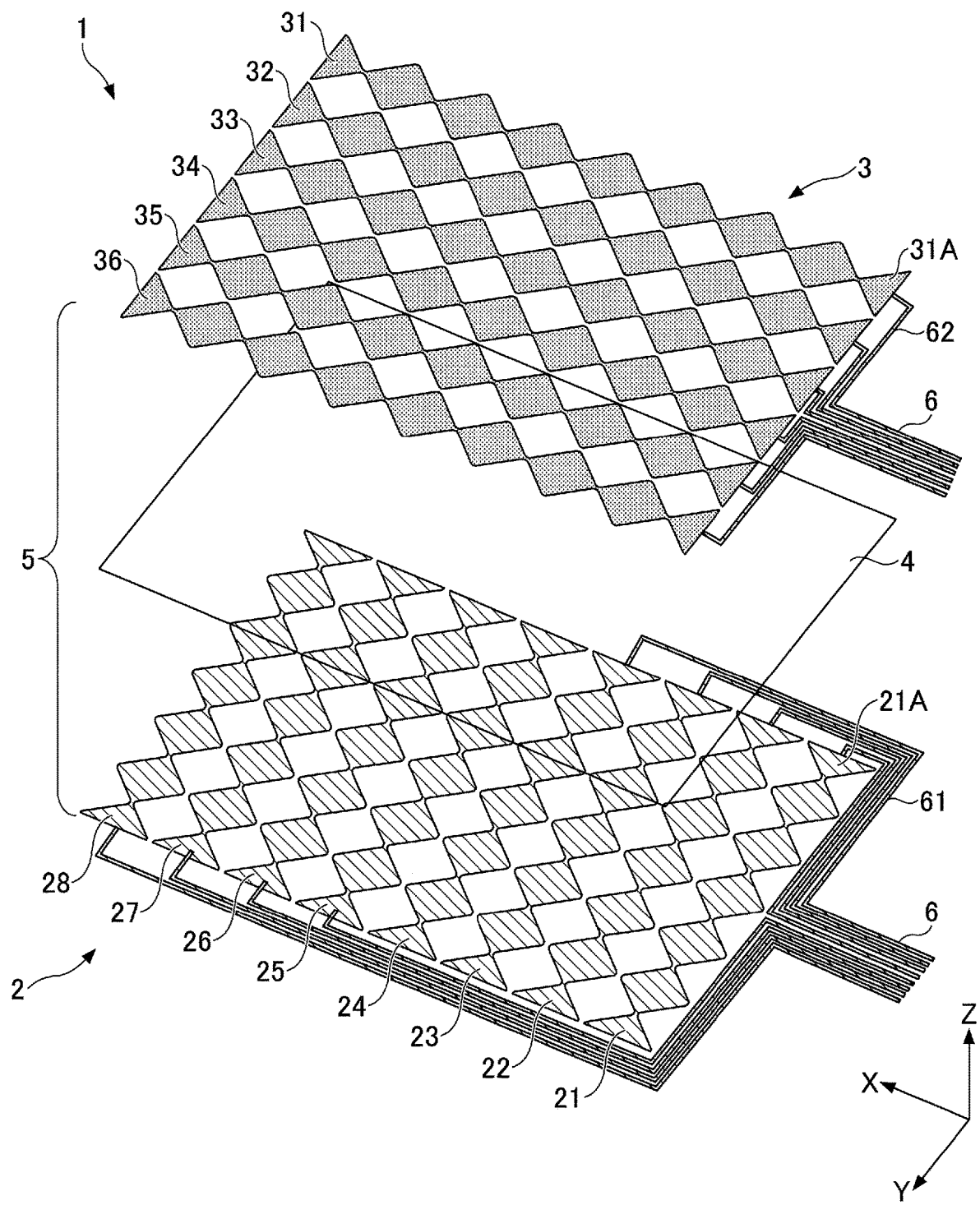
FIG. 1 is an exploded perspective view of a touch panel according to a first embodiment.

A first embodiment is described with reference to FIGS. 1 to 6. FIG. 1 is an exploded perspective view of a touch panel 1 according to the first embodiment.

The touch panel 1 is a projective capacitive touch panel and includes a lower layer 2, an upper layer 3, and an insulating layer 4 formed of a sheet-shaped insulator. The insulating layer 4 is disposed between the lower layer 2 and the upper layer 3. Transparent insulating films (not shown) are also provided below the lower layer 2 and above the upper layer 3.

Electrodes in the lower layer 2 and the upper layer 3 form a matrix. The touch panel 1 detects an operation on the touch panel 1 by detecting a change in the capacitance between an electrode of the lower layer 2 and an electrode of the upper layer 3.

The lower layer 2 includes multiple electrode arrays 21-28 (first arrays) that are arranged in the X direction in parallel with each other. Each of the electrode arrays 21-28 includes multiple electrodes arranged in the Y direction and is formed by connecting vertices of the electrodes that are next to each other in the Y direction. Each of the electrodes has a rhombus shape, except for end electrodes that are located at the ends of each of the electrode arrays 21-28 have a triangular shape obtained by dividing a rhombus.

The upper layer 3 includes multiple electrode arrays 31-36 (second arrays) that are arranged in the Y direction in parallel with each other. Each of the electrode arrays 31-36 includes multiple electrodes arranged in the X direction and is formed by connecting vertices of the electrodes that are next to each other in the X direction. Each of the electrodes has a rhombus shape, except for triangular end electrodes that are located at the ends of each of the electrode arrays 31-36 have a triangular shape obtained by dividing a rhombus.

The lower layer 2 and the upper layer 3 sandwich the insulating layer 4 and are arranged such that the electrodes of one of the lower layer 2 and the upper layer 3 are placed in spaces between the electrodes of the other one of the lower layer 2 and the upper layer 3, and a rectangular detection part 5 is formed as a whole. Thus, a matrix is formed by the electrodes of the lower layer 2 and the upper layer 3. The detection part 5 is an area for detecting a touch operation on the touch panel 1.

A controller connected to the touch panel 1 detects a touch position by sequentially scanning the electrode arrays 21-28 in the X direction, sequentially scanning the electrode arrays 31-36 in the Y direction, and measuring a change in capacitance between the electrodes forming a matrix in the X direction and the Y direction.

In the present embodiment, the end electrodes have a triangular shape. This makes it possible to place electrodes even at the four edges of the detection part 5 without leaving a space and to detect a touch even at the edges of the detection part 5.

A lead 61 extends from one of the end electrodes of each of the electrode arrays 21-28. Similarly, a lead 62 extends from one of the end electrodes of each of the electrode arrays 31-36. The leads are used to supply power to the electrodes or to measure voltages induced on the electrodes. The leads 61 and 62 are combined to form an output part 6 that connects the touch panel 1 to an external device. In the present embodiment, the output part 6 is disposed substantially in the middle of the -X side of the detection part 5.

Figure 2:
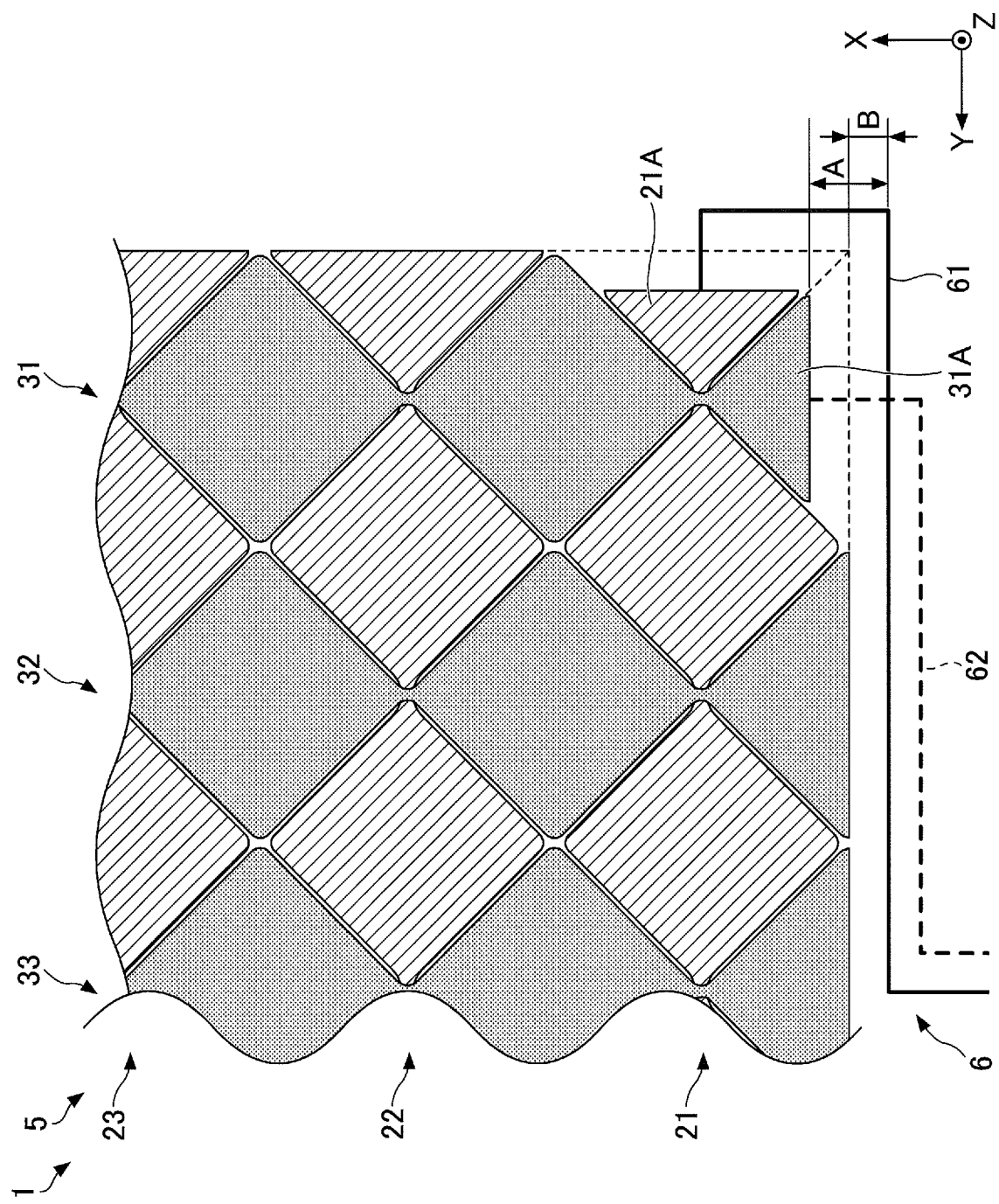
FIG. 2 is an enlarged view of a corner of a touch panel.

FIG. 2 is an enlarged view of a corner of the touch panel 1. As illustrated in FIG. 2, end electrodes located in at least one of the corners on one of the four sides of the detection part 5 where the output part 6 is located have an area that is less than the area of other end electrodes. In the example of FIG. 2, an end electrode 21A at one end of the electrode array 21 and an end electrode 31A at one end of the electrode array 31 form a corner of the touch panel 1, and the end electrodes 21A and 31A in the corner have an area less than the area of the other end electrodes. Therefore, an outer side of each of the end electrodes 21A and 31A is in parallel with the corresponding side of the detection part 5 and is indented inward from the outer sides of the other end electrodes.

Further, as illustrated in FIG. 2 the area of the end electrodes 21A and 31A is made smaller than the area of the other end electrodes.

In FIG. 1, four leads 61 leading from the end electrodes of four electrode arrays 21-24 in -Y side are illustrated. In FIG. 1, four leads 61 first extend in the -X direction toward the apex of the corner, bend at a right angle in the +Y direction after passing by the apex, and extend to the output part 6 in parallel with a side of the detection part 5. Among the leads 61 leading from the electrode arrays, the lead 61 extending from the end electrode 21A is disposed in the innermost position, and passes through positions closest to the end electrode 31A in the same corner.

If the end electrode 31A has the same size as the other end electrodes as indicated by a dotted line in FIG. 2, a distance B between a side of the end electrode 31A and the lead 61 extending from the end electrode 21A becomes relatively short. This tends to cause capacitive coupling between the end electrode 31A and the lead 61, and also cause capacitive coupling between the end electrode 21A and the end electrode 31A via the lead 61. As a result, the capacitance between the end electrodes 21A and 31A tends to become relatively high even when no touch operation is performed. This phenomenon in the corner causes variations in the capacitance reference value over the entire touch panel 1, and may reduce the detection accuracy of the touch panel 1.

In the present embodiment, the outer sides of the end electrodes 21A and 31A in the corner are indented inward to make a distance A between the end electrode 31A and the lead 61 greater than the distance B between the other end electrodes and the lead 61. This configuration can suppress the capacitive coupling between the end electrode 31A and the lead 61, suppress the capacitive coupling between the end electrodes 21A and 31A via the lead 61, and reduce the capacitance between the end electrodes 21A and 31A.

The distance A in the corner is preferably greater than or equal to two times of the distance B on the same side of the touch panel as the end electrode 31A. This configuration can place the end electrode 31A sufficiently away from the lead 61 and more reliably suppress the capacitive coupling between the end electrode 31A and the lead 61.

If the capacitance coupling between the end electrodes 21A and 31A can be suppressed, the capacitance reference value in the corner can be made closer to the capacitance reference value in other positions, and the capacitance reference value can be made uniform over the entire touch panel 1. This in turn makes it possible to improve the detection accuracy in the entire area of the detection part 5 regardless of the touch position.

The distance between the end electrode 21A and the lead 61 also influences the capacitive coupling between the end electrode 21A and the end electrode 31A via the lead 61. Compared with a case where only the area of the end electrode 31A is reduced, reducing the areas of both of the end electrodes 21A and 31A makes it possible to further decrease the capacitance reference value in the corner of the touch pannel 1, and can make the capacitance on the touch pannel 1 more uniform.

Figure 3:
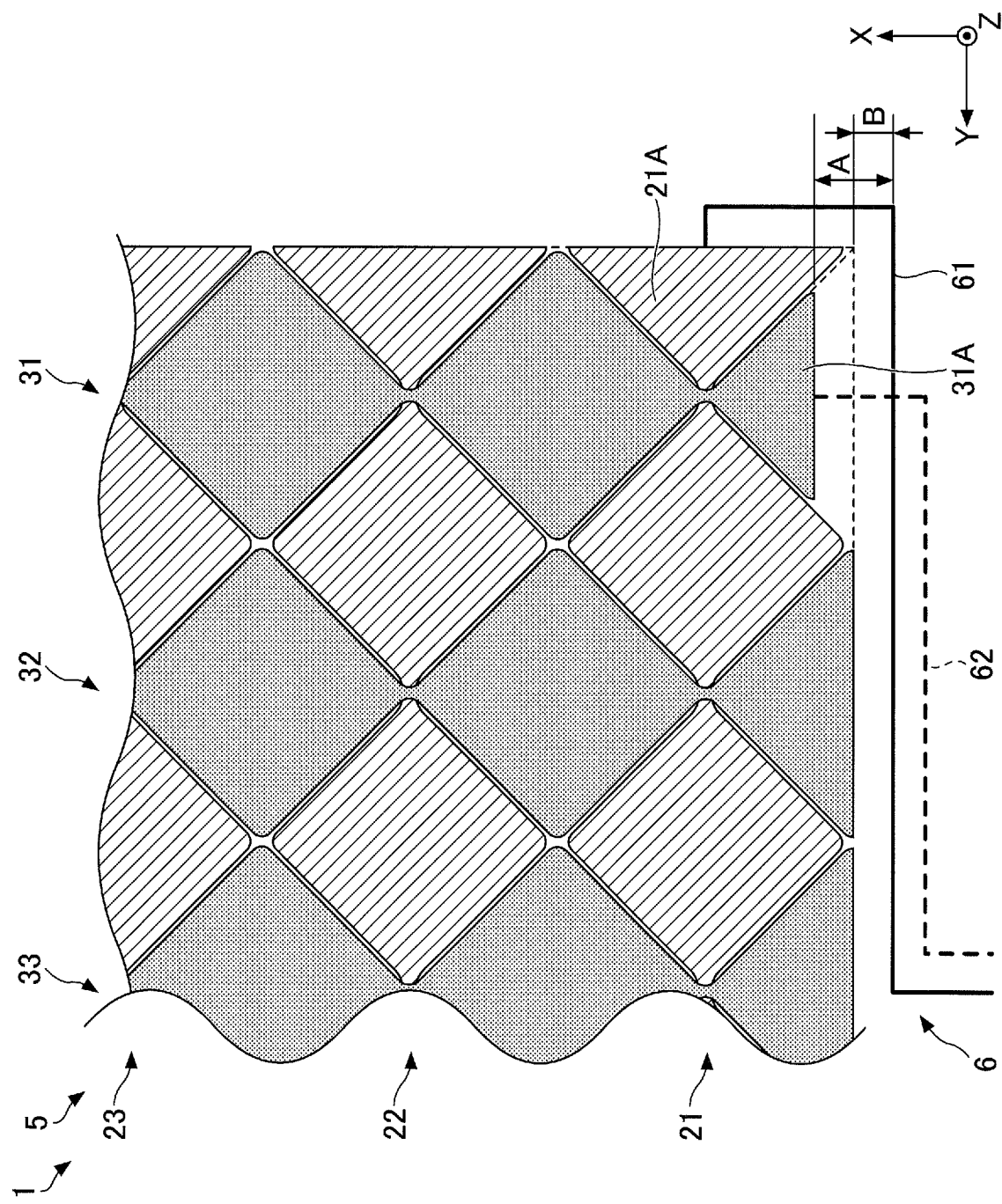
FIG. 3 is an enlarged view of a corner of a touch panel according to a first variation of the first embodiment.
Figure 4:
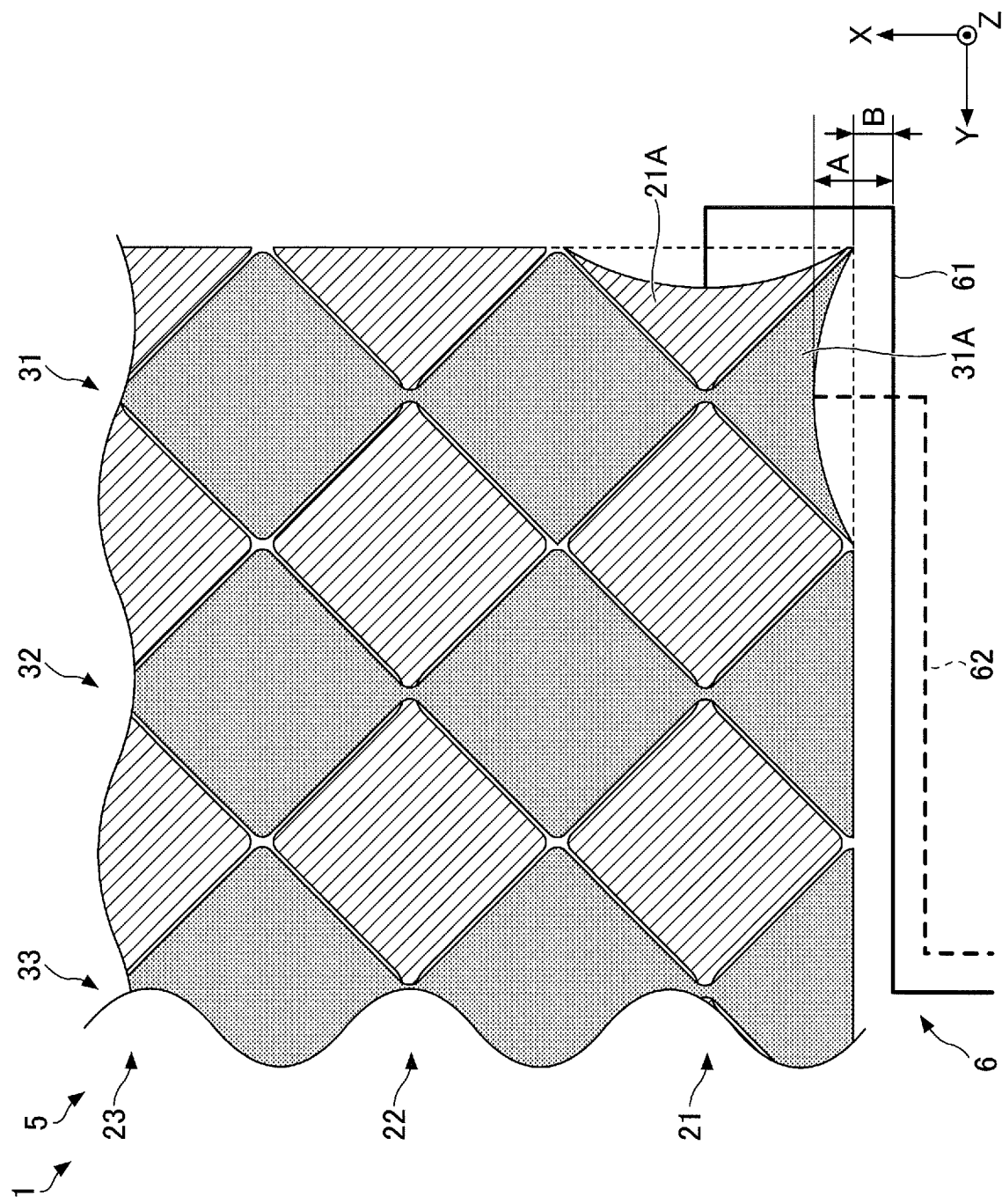
FIG. 4 is an enlarged view of a corner of a touch panel according to a second variation of the first embodiment.
Figure 5:
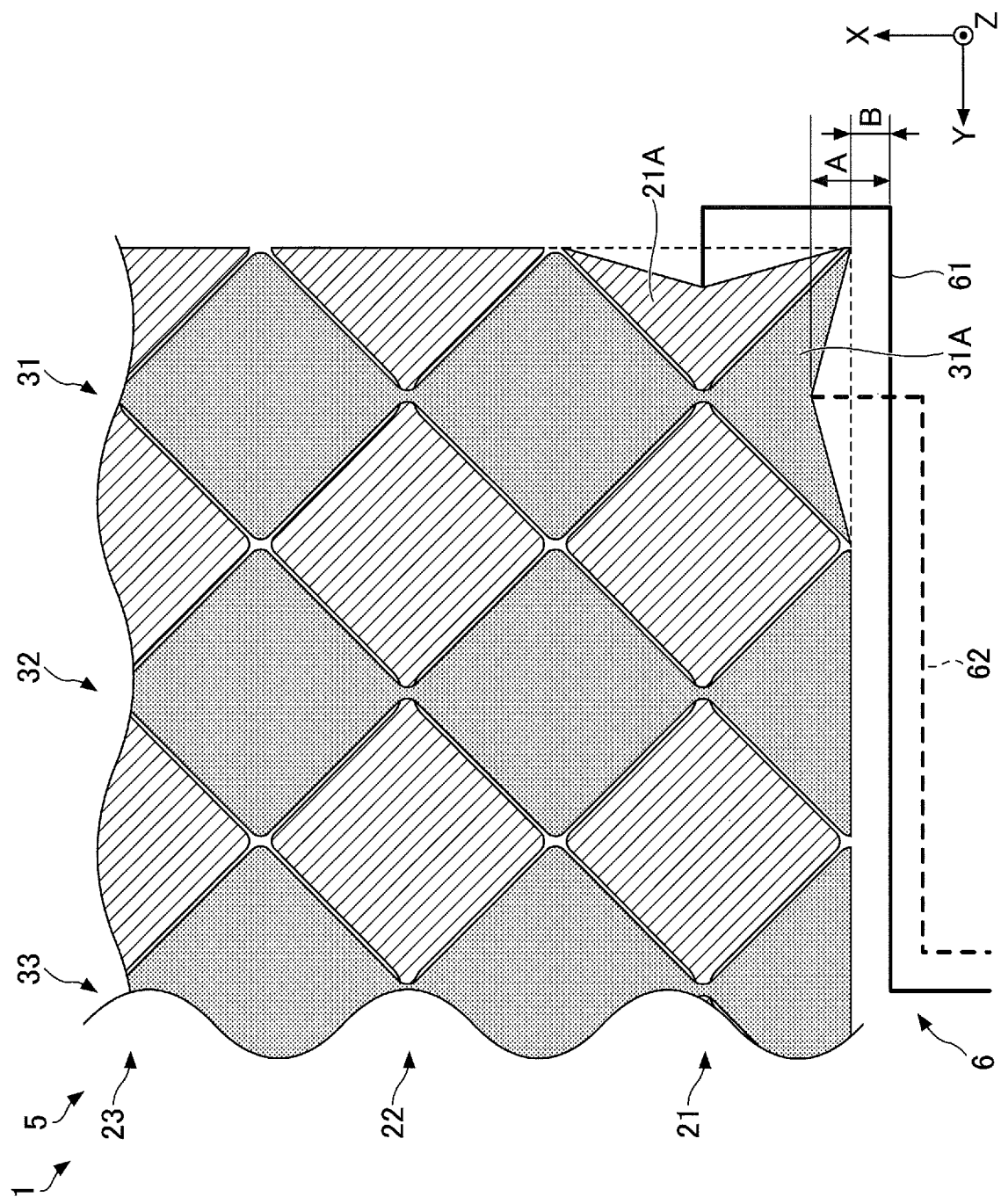
FIG. 5 is an enlarged view of a corner of a touch panel according to a third variation of the first embodiment.
Figure 6:
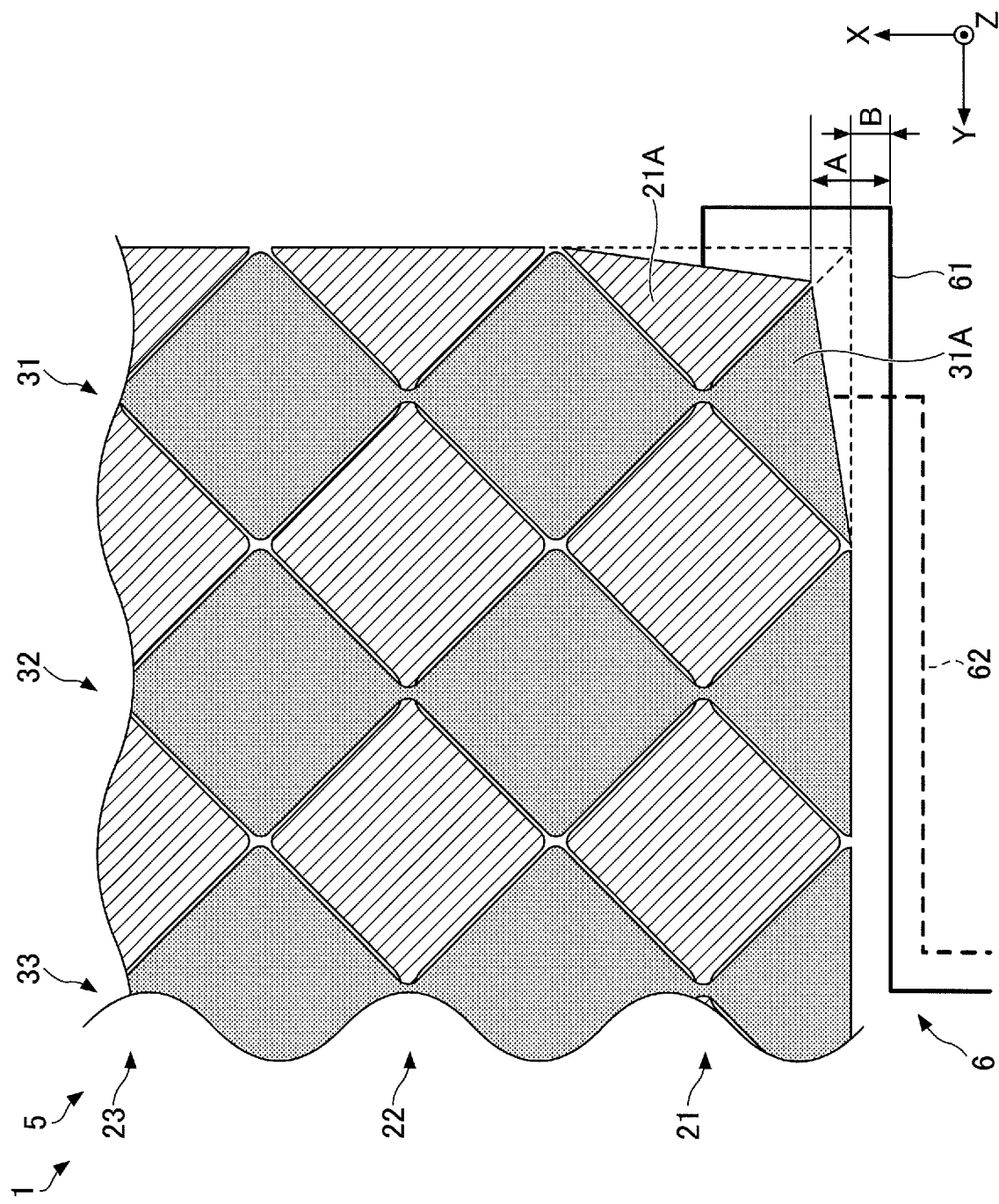
FIG. 6 is an enlarged view of a corner of a touch panel according to a fourth variation of the first embodiment.

Variations of the first embodiment are described with reference to FIGS. 3 through 6. FIGS. 3 thourgh 6 are enlarged views of a corner of the touch panel 1 according to first through fourth variations of the first embodiment. In the first variation illustrated in FIG. 3, out of the two end electrodes 21A and 31A in the same corner, only the area of the end electrode 31A, which faces the side of the detection part 5 on which the output part 6 is disposed, is reduced, and the area of the end electrode 21A is not reduced.

The end electrodes 21A and 31A may also have shapes other than the shapes illustrated in FIG. 2 as long as the outer sides of the end electrodes 21A and 31A are indented from the sides of other end electrodes. In the second variation illustrated in FIG. 4, the outer side of each of the end electrodes 21A and 31A has an arc shape that is indented inward. In the third variation illustrated in FIG. 5, the outer side of each of the end electrodes 21A and 31A has an angularly bent shape that is indented inward. In the fourth variation illustrated in FIG. 6, the outer side of each of the end electrodes 21A and 31A is inclined inward and toward a line bisecting the corner.

Second Embodiment

Figure 7:
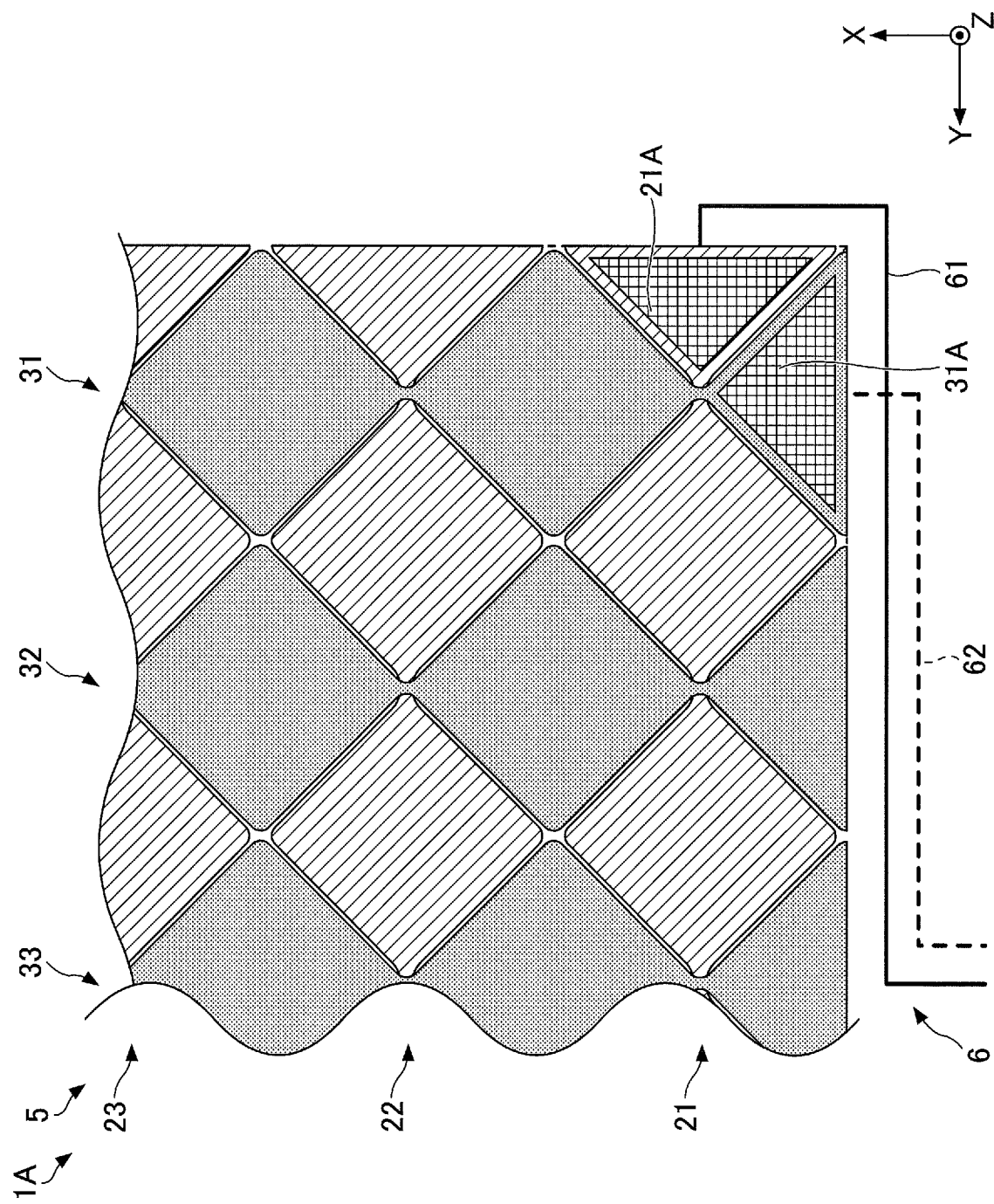
FIG. 7 is an enlarged view of a corner of a touch panel according to a second embodiment.
Figure 8:
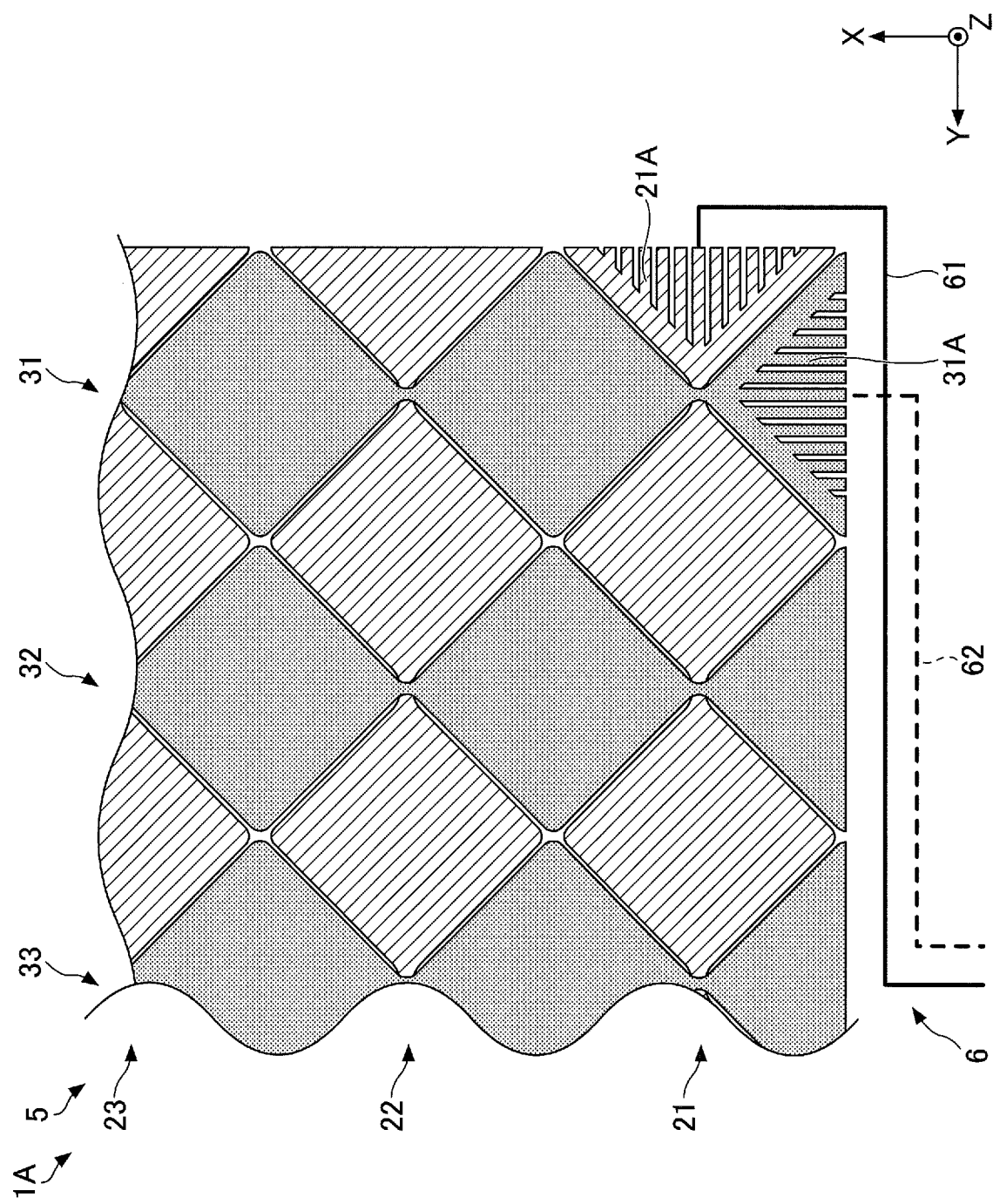
FIG. 8 is an enlarged view of a corner of a touch panel according to the second embodiment.

A second embodiment is described with reference to FIGS. 7 and 8. FIGS. 7 and 8 are enlarged views of a corner of a touch panel 1A according to the second embodiment. In the touch panel 1A, openings are formed in each of the end electrodes 21A and 31A.

The end electrodes 21A and 31A may have a mesh shape having openings as illustrated in FIG. 7, or may have a comb shape having slits as illustrated in FIG. 8.

In the second embodiment, the practical areas of the conductive parts of the end electrodes 21A and 31A are reduced by forming openings in the end electrodes 21A and 31A. This makes it possible to suppress the capacitive coupling between the end electrodes 21A and 31A via the lead 61 without increasing the distances between the end electrodes 21A and 31A and the lead 61 as in the example of FIG. 2, and to decrease the reference value of capacitance between the end electrodes 21A and 31A. Therefore, similarly to the first embodiment, the second embodiment can make the capacitance reference value uniform over the entire area of the touch panel 1A, and can improve the detection accuracy of the touch panel 1A. Also, because the contour of the end electrodes 21A and 31A in the second embodiment is the same as the contour of other end electrodes, a touch can be detected even at an edge of the corner, and the detection area of the touch panel 1A can be made greater than that in the example of FIG. 2.

Third Embodiment

Figure 9:
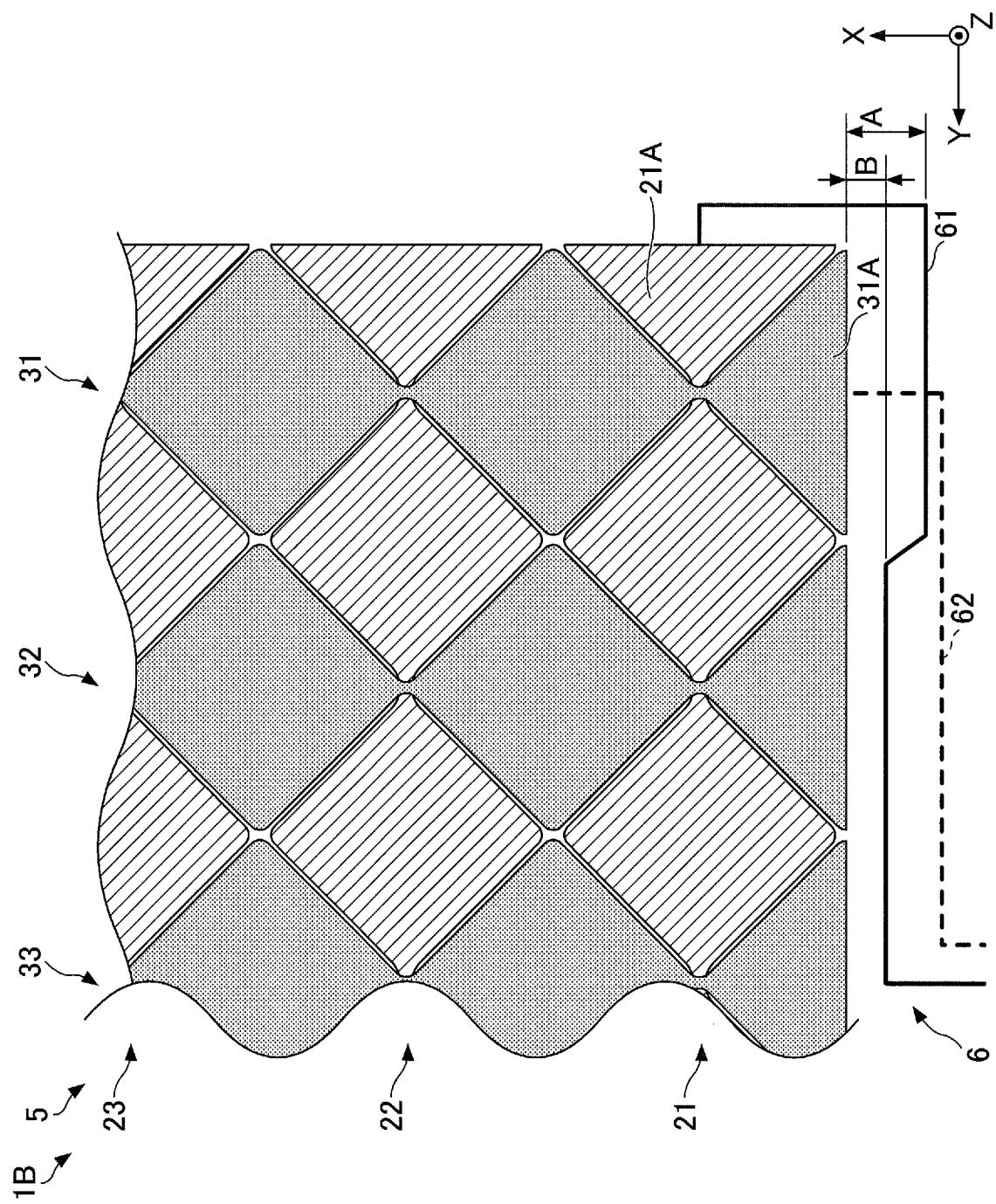
FIG. 9 is an enlarged view of a corner of a touch panel according to a third embodiment.

A third embodiment is described with reference to FIG. 9. FIG. 9 is an enlarged view of a corner of a touch panel 1B according to the third embodiment. In the touch panel 1B, while the area of each of the end electrodes 21A and 31A is the same as the area of each of the other end electrodes, a portion of the lead 61 facing the end electrode 31A is disposed away from the end electrode 31A such that the distance A between the end electrode 31A and the lead 61 becomes greater than the distance B between other end electrodes and the lead 61.

The third embodiment can also make the distance A greater than the distance B. Therefore, the third embodiment can suppress the capacitive coupling between the end electrode 31A and the lead 61, and suppress the capacitive coupling between the end electrode 21A and the end electrode 31A via the lead 61. Accordingly, similarly to the first and second embodiments, the third embodiment can make the capacitance reference value uniform over the entire area of the touch panel 1B, and can improve the detection accuracy of the touch panel 1B.

In FIG. 9, a portion of the lead 61 facing the outer side of the end electrode 21A is disposed away from the outer side of the end electrode 21A, in addition to the portion of the lead 61 facing the outer side of the end electrode 31A. Also, a portion of the lead 61 facing the outer sides of the other end electrodes may be positioned further outward than the position illustrated in FIG. 9.

An aspect of this disclosure provides a touch panel that can improve the detection accuracy in the entire area of a detection part.

The present invention is not limited to the embodiments described above, and variations and modifications may be made without departing from the scope of the present invention. Also, combinations of components described in the above embodiments may be changed unless the changed combinations are technically inconsistent.

In the above embodiments, the output part 6 is disposed on the −X side of the touch panel. However, the output part 6 may be disposed on any other side, e.g., the −Y side of the touch panel. In this case, the lead 62 connected to the end electrode 31A is laid out along the outer side of the end electrode 21A. Accordingly, the capacitive coupling between the end electrode 21A and the end electrode 31A via the lead 62 can be suppressed by making the distance between the outer side of the end electrode 21A and the lead 62 greater than the distance between the other end electrodes and the lead 62.

Also, positions of the lower layer 2 and the upper layer 3 in a stacking direction may be exchanged.

In the above embodiments, the lower layer 2 with multiple electrode arrays 21-28 and the upper layer 3 with multiple electrode arrays 31-36 are stacked via the insulating layer 4. However, any other configuration may be used. For example, both of the first arrays and the second arrays may be disposed on one surface of a substrate such as the insulating layer 4.

What is claimed is:

1. A touch panel, comprising:
first arrays of electrodes, each of the first arrays including multiple electrodes that are arranged in a first direction, the first arrays being arranged parallel to each other in a second direction that intersects the first direction, the electrodes of the each of the first arrays including triangular end electrodes disposed at ends of the each of the first arrays and rhombus-shaped electrodes that are disposed between the triangular end electrodes, and vertices of the electrodes of the each of the first arrays being connected to each other;
second arrays of electrodes, each of the second arrays including multiple electrodes that are arranged in the second direction, the second arrays being arranged parallel to each other in the first direction, the electrodes of the each of the second arrays including triangular end electrodes disposed at ends of the each of the second arrays and rhombus-shaped electrodes that are disposed between the triangular end electrodes, and vertices of the electrodes of the each of the second arrays being connected to each other; and
an output part where leads extending from the triangular end electrodes are combined and connected to an external device, wherein
the electrodes of one of the first arrays and the second arrays are positioned in gaps between the electrodes of another one of the first arrays and the second arrays such that the first arrays of electrodes and the second arrays of electrodes form a rectangular detection part as a whole;
one of the triangular end electrodes of the first arrays and one of the triangular end electrodes of the second arrays constitute corner electrodes that are located in a same corner on one of four sides of the rectangular detection part where the output part is located, and at least one of the corner electrodes has an area that is less than an area of other triangular end electrodes, such that an outer side of the at least one of the corner electrodes is parallel to and indented from the one of four sides of the rectangular detection part; and
each of the triangular end electrodes comprises three straight lines.

2. The touch panel as claimed in claim 1, wherein the corner electrode is indented inward from the corresponding side of the rectangular detection part.

3. The touch panel as claimed in claim 1, wherein the corner electrode includes openings.

4. A touch panel, comprising:
first arrays of electrodes, each of the first arrays including multiple electrodes that are arranged in a first direction, the first arrays being arranged parallel to each other in a second direction that intersects the first direction, the electrodes of the each of the first arrays including triangular end electrodes disposed at ends of the each of the first arrays and rhombus-shaped electrodes that are disposed between the triangular end electrodes, and vertices of the electrodes of the each of the first arrays being connected to each other;

second arrays of electrodes, each of the second arrays including multiple electrodes that are arranged in the second direction, the second arrays being arranged parallel to each other in the first direction, the electrodes of the each of the second arrays including triangular end electrodes disposed at ends of the each of the second arrays and rhombus-shaped electrodes that are disposed between the triangular end electrodes, and vertices of the electrodes of the each of the second arrays being connected to each other; and leads each of which extends from one of the triangular end electrodes of the first arrays and the second arrays connects the one of the triangular end electrodes to an external device, wherein the electrodes of one of the first arrays and the second arrays are positioned in gaps between the electrodes of another one of the first arrays and the second arrays such that the first arrays of electrodes and the second arrays of electrodes form a rectangular detection part as a whole;

the triangular end electrodes consist of two corner electrodes located in a corner of the rectangular detection part;

the leads include a lead, the lead including a first straight-line segment and a second straight-line segment connected to the first straight-line segment, both the first straight-line segment and the second straight-line segment extending parallel to a side of the rectangular detection part, the first straight-line segment being only alongside the corner electrode whose outside edge is on the side of the rectangular detection part, the second straight-line segment being only alongside triangular end electrodes other than the two corner electrodes whose outside edges are on the side of the rectangular detection part, the triangular end electrodes being arranged next to the corner electrodes, the first straight-line segment being at a first distance from the outside edge of the corner electrode, the second-line segment being at a second distance from the outside edge of the triangular end electrode, the first distance being greater than the second distance; and each of the triangular end electrodes comprises three straight lines.

5. The touch panel as claimed in claim 4, wherein the leads extend in parallel with sides of the rectangular detection part.

6. A touch panel, comprising:

first arrays of electrodes, each of the first arrays including multiple electrodes that are arranged in a first direction, the first arrays being arranged parallel to each other in a second direction that intersects the first direction, the electrodes of the each of the first arrays including triangular end electrodes disposed at ends of the each of the first arrays and rhombus-shaped electrodes that are disposed between the triangular end electrodes, and vertices of the electrodes of the each of the first arrays being connected to each other;

second arrays of electrodes, each of the second arrays including multiple electrodes that are arranged in the second direction, the second arrays being arranged parallel to each other in the first direction, the electrodes of the each of the second arrays including triangular end electrodes disposed at ends of the each of the second arrays and rhombus-shaped electrodes that are disposed between the triangular end electrodes, and vertices of the electrodes of the each of the second arrays being connected to each other; and leads each of which extends from one of the triangular end electrodes of the first arrays and the second arrays and connects the one of the triangular end electrodes to an external device, wherein the first arrays of electrodes and the second arrays of electrodes form a rectangular detection part as a whole;

one of the triangular end electrodes of the first arrays and one of the triangular end electrodes of the second arrays constitute corner electrodes that are disposed in a same corner on a side of the rectangular detection part and facing the leads, and at least one of the corner electrodes is smaller in area than other triangular end electrodes disposed on the same side of the rectangular detection part, such that an outer side of the at least one of the corner electrodes is parallel to and indented from the side of the rectangular detection part; and each of the triangular end electrodes comprises three straight lines.

* * * * *